United States Patent [19]
Gotomyo

[11] Patent Number: 5,145,231
[45] Date of Patent: Sep. 8, 1992

[54] ROOF STRUCTURE OF AN AUTOMOTIVE VEHICLE

[75] Inventor: Yasuo Gotomyo, Hiroshima, Japan

[73] Assignee: Mazda Motor Corporation, Hiroshima, Japan

[21] Appl. No.: 794,530

[22] Filed: Nov. 9, 1991

Related U.S. Application Data

[63] Continuation-in-part of Ser. No. 674,117, Mar. 25, 1991, abandoned.

[30] Foreign Application Priority Data

Mar. 31, 1990 [JP] Japan .................. 2-86498
Feb. 27, 1991 [JP] Japan .................. 3-56055

[51] Int. Cl.⁵ .................................. B60J 7/047
[52] U.S. Cl. .................. 296/220; 296/223; 296/224
[58] Field of Search ............. 296/220, 223, 224, 219, 296/222

[56] References Cited

U.S. PATENT DOCUMENTS

| | | | |
|---|---|---|---|
| 1,893,350 | 1/1930 | Austin | 296/219 |
| 3,036,860 | 5/1962 | Geiger | 296/220 X |
| 4,185,868 | 1/1980 | Kaltz | 296/220 X |

FOREIGN PATENT DOCUMENTS

| | | | |
|---|---|---|---|
| 1503928 | 10/1967 | France | 296/219 |
| 0112318 | 9/1981 | Japan | 296/220 |
| 0008824 | 1/1987 | Japan | 296/216 |
| 0060420 | 3/1989 | Japan | 296/216 |

Primary Examiner—Dennis H. Pedder
Attorney, Agent, or Firm—Fish & Richardson

[57] ABSTRACT

Disclosed is a roof structure of a T-bar type for an automotive vehicle having a roof body with roof apertures formed on both sides of a central roof section and covered with roof plate panels. The roof plate panels are each movable between its closed position to close the roof apertures and its open position to open the roof apertures. When the roof plate panels are located in the open positions, one of the roof plate panels is superimposed on the other without interference from each other. The roof plate panels are disposed such that one of the roof plate panels moves upwards from its closed position in a predetermined height higher than the height in which the other moves upwards from its closed position and then horizontally to its open position in which the roof apertures are wide open.

16 Claims, 6 Drawing Sheets

ROOF STRUCTURE OF AN AUTOMOTIVE VEHICLE

This application is a continuation-in-part application of U.S. application Ser. No. 07/674,117, filed Mar. 25, 1991, now abandoned.

BACKGROUND OF THE INVENTION

1. Field of the Invention

The present invention relates to a roof structure of an automotive vehicle and, more particularly, to a roof structure of an automotive vehicle of a so-called T-bar roof type in which roof plate panels are disposed so as to travel or move transversely to open or close roof apertures formed on the roof of the automotive vehicle and the roof plate panels are located in a middle position of the roof extending longitudinally, when the roof apertures are opened.

2. Description of Related Art

A basic T-bar roof structure of a conventional roof body of the automotive vehicle consists of a front roof section located at a front portion of the roof body, a rear roof section located at a rear portion thereof, and a central roof section located in a middle position between the both roof sides and extending longitudinally between the front roof section and the rear roof section and located in a middle position extending longitudinally between the left-hand and right-hand sides of the roof. Disposed on both of the left-hand and right-hand sides of the central roof section of the roof body are left-hand and right-hand roof apertures so as to extend continuously and integrally with openings for the left-hand and right-hand side doors.

The roof of the T-bar type draws increasing attention and becomes popular particularly among young people because this kind of the roof can provide passengers with a large extent of open and refreshing feel.

It is noted, however, that one of the biggest features of the T-bar roof of the automotive vehicle is open and refreshing feel that can be given by a largely open area of the roof apertures over the heads of the passengers.

The conventional T-bar type roof is arranged such that the roof plate panels are detachable from the roof apertures of the roof. This type of the roof plate panel, however, suffers from the disadvantages that operations of mounting and detaching the roof plate panel require laborious work and they are time-consuming. Further, the roof of this type presents the defect that a space should be provided for accommodation of the roof plate panels when the roof plate panels have been detached from the roof aperture.

Japanese Utility Model Laid-open (kokai) Publication No. 179,228/1988 proposes the structure of the roof wherein the roof plate panels are connected through a parallel link to the roof body so as to assume a closed position in which the roof aperture is covered with the roof plate panel and an open position in which the roof plate panel is located in a position nearly over the central roof section of the roof to open the roof aperture. The roof plate panel of this type, however, is manually operated to open or close the roof aperture, and this roof plate panel moves in such a manner as moving upwards or downwards, as in a convex way, when the roof aperture is opened or closed, because the roof plate panel is connected to the roof body through the parallel link. Further, the roof structure disclosed in this utility model publication is constructed such that the left-hand and right-hand roof plate panels are juxtaposed transversely over the central roof section in parallel to each other, when the roof plate panels assume the positions to open the roof apertures.

Further, Japanese Utility Model Laid-open (kokai) Publication No. 180,421/1988 discloses another conventional technology in which a guide rail extending in the transverse direction of the automotive vehicle is disposed on the side of the roof body and a slider sliding in the transverse direction thereof along the guide rail is connected to a transversely outer end portion of the roof plate panel. Further, a pivotal arm is disposed to connect a transversely central portion of the roof plate panel to the roof body, thereby allowing the roof plate panel to assume its closed position to close the roof aperture and to assume its open position to open the roof plate panel.

For the technology as disclosed in this publication, the roof plate panels are opened or closed automatically by means of the slider connected to a driving source through a cable, without manual operation. In opening or closing the roof apertures, a transversely outer end portion of the roof plate panel travels or moves in a transversely horizontal direction along the guide rail, while a transversely inner end portion thereof travels or moves in a generally convex manner. Further, the left-hand and right-hand roof plate panels are disposed in parallel to each other in the transverse direction of the automotive vehicle when the roof plate panels are placed over the central roof section of the roof to open the respective roof apertures.

The juxtaposition of the left-hand and right-hand roof plate panels in their open positions presents the following problems, as the technology disclosed in these patent publications. In other words, when the left-hand and right-hand roof plate panels are juxtaposed over the central roof section, the transverse width dimension of the central roof section should be as large as approximately twice the transverse width dimension of the central roof section for a single roof plate panel. Conversely speaking, the transverse width dimension of the roof plate panel should be smaller than a half of the transverse width dimension of the central roof section. This imposes great restrictions upon the setting of the transverse width dimension of the central roof section. Hence, an automotive vehicle with a small transverse width dimension of the vehicle body has the problem that the roof aperture necessarily becomes smaller.

Furthermore, the problem may arise with the roof structure having the roof plate panel disposed so as to travel or move in a generally convex fashion, as disclosed previously in the patent publication. When the roof plate panel travels or moves in such an arc-like manner as drawing a convex curve during opening or closing the roof aperture, the roof plate panel is caused to be spaced apart upward to a great extent from the roof body while the roof plate panel travels between its closed position and its open position. Hence, when the roof plate panel is opened or closed during driving the automotive vehicle, the roof plate panel apart upwards largely from the roof body may undergo an influence from wind and becomes unstable, thereby causing noisy sounds to occur. Furthermore, it is practically impossible to suspend the roof plate panel in an intermediate position in the course of opening or closing the roof aperture, so that the open area of the roof aperture cannot be controlled with freedom.

SUMMARY OF THE INVENTION

Therefore, the object of the present invention is to provide a roof structure of an automotive vehicle so adapted as to shorten a width dimension of the central roof section in the transverse direction of the automotive vehicle body. In the other words, the roof structure of the automotive vehicle according to the present invention is so arranged as to enlarge a transverse width dimension of the roof aperture connected directly and continuously to an aperture for each of the side doors.

Another object of the present invention is to provide a roof structure of an automotive vehicle so adapted as to impart a large width dimension of the roof aperture in the transverse direction of the automotive vehicle body and to stabilize the roof plate panel in the course of travelling as well as to adjust the open area of the roof aperture in an arbitrary manner.

In order to achieve the aforesaid object, a first aspect of the present invention consists of the roof structure of the automotive vehicle having a roof covering compartment, which comprises:

the roof body comprising a front roof section, a rear roof section and a central roof section, the front roof section disposed at a front portion of the roof body, the rear roof section disposed at a rear portion thereof, and the central roof section interposed between the front roof section and the rear roof section and extending longitudinally in a transversely middle position between left-hand and right-hand roof sides; the roof body provided with a first roof aperture and a second roof aperture on left-hand and right-hand sides of the roof body, respectively;

an outer side of the first roof aperture facing and communicated to an aperture for a first side door, a front side thereof connected to the front roof section, a rear side thereof connected to the rear roof section, and an inner side thereof connected to one side of the central roof section;

an outer side of the second roof aperture facing and communicated to an aperture for a second side door, a front side thereof connected to the front roof section, a rear side thereof connected to the rear roof section, and an inner side thereof connected to the other side of the central roof section;

the first roof aperture having a first roof plate panel so disposed as to assume a closed position and an open position, the closed position in which the first roof aperture is closed with the first roof plate panel and the open position in which the first roof aperture is opened over its entire longitudinal length and in which the first roof plate panel is located over the central roof section; and the second roof aperture having a second roof plate panel so disposed as to assume a closed position and an open position, the closed position in which the second roof aperture is closed with the second roof plate panel and the open position in which the second roof aperture is opened over its entire longitudinal length and in which the second roof plate panel is located over the central roof section;

wherein the first roof plate panel is superimposed on the second roof plate panel when each of the first roof plate panel and the second roof plate panel is located in the open position.

In the first aspect of the present invention, the first and second roof plate panels are superimposed on the central roof section when they are located in their open positions to open the respective roof apertures, so that the transverse width dimension of the central roof section can be reduced to the transverse width dimension of a single sheet of the roof plate panel. In other words, the transverse width dimension of each of the roof plate panels can be enlarged to be as nearly large as the transverse width dimension of the central roof section so that the transverse width dimension of the roof apertures can be enlarged to a larger extent than conventional ones.

In order to achieve the another object as described hereinabove, a second aspect of the present invention consists of a roof structure of the automotive vehicle, in which, on top of the foregoing, the first and second roof plate panels travel or move in such a manner that, when the first and second roof plate panels are transferred from their closed positions to their open positions to open their respective roof apertures, the first and second roof plate panels travel or move first in an upward direction in synchronization with each other in predetermined upward distances and then in a horizontal direction toward their open positions and, when the first and second roof plate panels are transferred from their open positions to their closed positions to close their respective roof apertures, the first and second roof plate panels travel or move first in a horizontal direction toward their closed positions in synchronization with each other and then in a downward direction in predetermined upward distances; wherein the predetermined upward or downward distance in which the first roof plate panel travels or moves is set to be higher than the predetermined upward or downward distance in which the second roof plate panel travels or moves, whereby the first roof plate panel is superimposed on the second roof plate panel when the first and second roof plate panels are located in their closed positions.

More specifically, the second aspect of the present invention is characterized by a roof structure of an automotive vehicle having a roof body covering a vehicle compartment, which comprises:

the roof body comprising a front roof section, a rear roof section and a central roof section, the front roof section disposed at a front portion of the roof body, the rear roof section disposed at a rear portion thereof, and the central roof section interposed between the front roof section and the rear roof section and extending longitudinally in a middle position between left-hand and right-hand roof sides; the roof body being provided with a first roof aperture and a second roof aperture on left-hand and right-hand sides of the roof body;

an outer side of the first roof aperture facing and connected to an aperture for a first side door, a front side thereof connected to the front roof section, a rear side thereof connected to the rear roof section, and an inner side thereof connected to one side of the central roof section;

an outer side of the second roof aperture facing and connected to an aperture for a second side door, a front side thereof connected to the front roof section, a rear side thereof connected to the rear roof section, and an inner side thereof connected to the other side of the central roof section;

the first roof aperture having a first roof plate panel so disposed as to assume a closed position and an open position, the closed position in which the first roof aperture is closed with the first roof plate panel position in which the first roof aperture is opened over its entire longitudinal length and in which the first roof plate panel is located over the central roof section; and the second roof aperture having a second roof plate panel so disposed as to assume a closed position and an open position, the closed position in which the second roof aperture is closed with the second roof plate panel and the open position in which the second roof aperture is opened over its entire longitudinal length and in which the second roof plate panel is located over the central roof section;

wherein each of the first roof plate panel and the second roof plate panel moves from the closed position to the open position by moving each of the first roof plate panel and the second roof plate panel upwards in a predetermined distance from the closed position and moving each of the first roof plate panel and the second roof plate panel horizontally toward the central roof section to the open position while opening the first roof aperture and the second roof aperture, respectively;

wherein each of the first roof plate panel and the second roof plate panel moves from the open position to the closed position by moving each of the first roof plate panel and the second roof plate panel horizontally from the open position in a direction opposite to the direction in which each of the first roof plate panel and the second roof plate panel is moved to open the respective first and second roof apertures and by moving each of the first roof plate panel and the second roof plate panel downwards in the predetermined distance toward the closed position while closing the first roof aperture and second roof aperture, respectively;

wherein the predetermined distance in which the first roof plate panel is moved upwards or downwards differs from the predetermined distance in which the second roof plate panel is moved upwards or downwards; and wherein the first roof plate panel is superimposed on the second roof plate panel when each of the first roof plate panel and the second roof plate panel is located in the open position.

In the second aspect of the present invention, the outer end of each of the roof plate panels is arranged to travel between its open position and its closed position in such a locus as tracing a line moving in an upward direction and in a horizontal direction. Further, it is travelled in a distance which is not apart from the roof body to an unnecessary extent during the travel of the roof plate panels. Hence, the roof plate panel can be moved or travelled in a stable manner more than conventional ones even if it would be opened or closed during driving the automotive vehicle. It is also possible to suspend the roof plate panel in an intermediate position between the open position and the closed position and to adjust the open area of the roof aperture with high freedom. This arrangement causes no problem that the first and second roof plate panels interfere with each other when they are moved or travelled between their open positions and the closed positions in synchronization with each other.

In other words, in conventional cases where the first roof plate panel is superimposed on the second roof plate panel in the position above the central roof section of the roof body and where the first and second roof plate panels are travelled upwards or downwards to follow in an upwards curved, arc-like locus, the locus of travel of the first roof plate panel may intersect the locus of travel of the second roof plate panel located in the position above the central roof section of the roof body Therefore, when the first roof plate panel is moved or travelled in synchronization with the second roof plate panel, there may be the risk that the first and second roof plate panels may intersect and interfere with each other during the course of superimposing the first and second roof plate panels on the central roof section of the roof body. On the other hand, the arrangement for the roof structure of the automotive vehicle according to the present invention causes no such a problem because the first and second roof plate panels do not interfere with each other even if they are moved or travelled in synchronization with each other because the locus of the travel of the first roof plate panel does not intersect the locus of the travel of the second roof plate panel.

Other objects, features and advantages of the present invention will become apparent during the course of the description of the preferred embodiments, which follows, with reference to the accompanying drawings.

DESCRIPTION OF THE PREFERRED EMBODIMENTS

The present invention will be described more in detail by way of examples with reference to the accompanying drawings.

Figure 1:
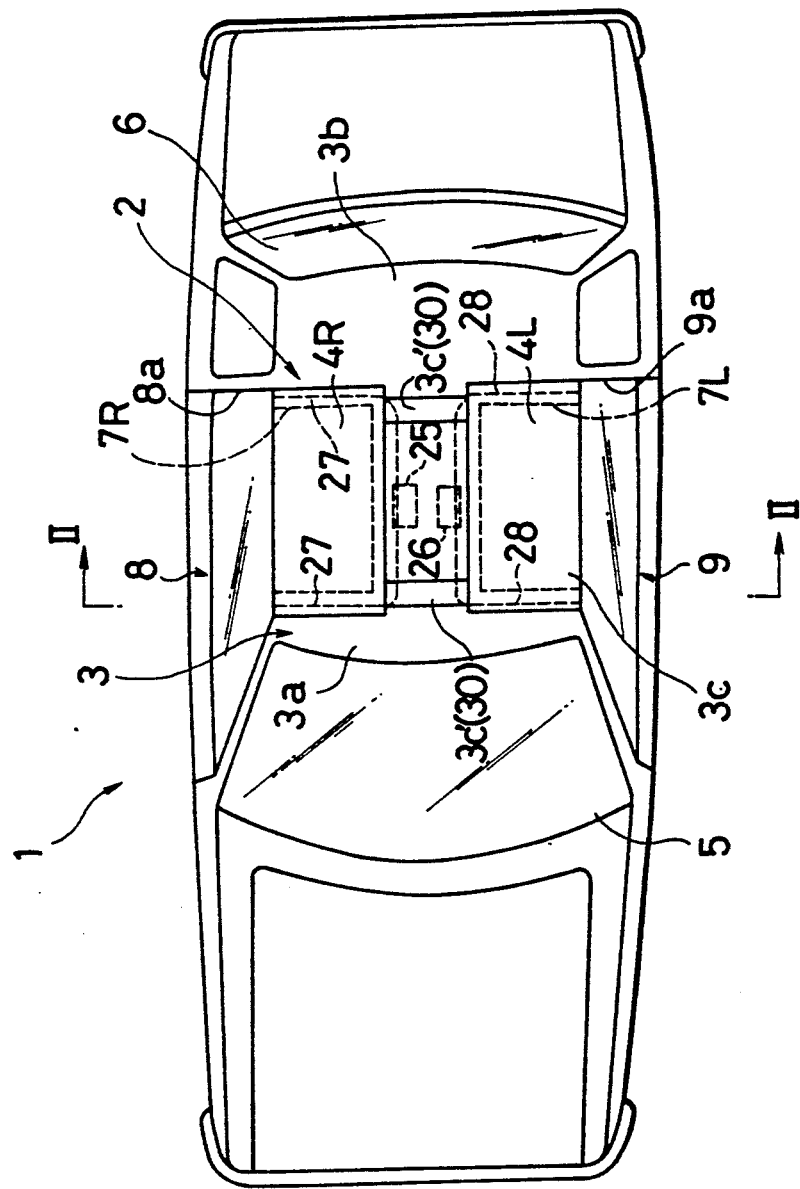
FIG. 1 is a plan view showing an automotive vehicle to which the roof structure according to the present invention is applied.

As shown in FIG. 1, reference numeral 1 denotes a two-door type automotive vehicle of a so-called T-bar roof, having a roof 2 covering a vehicle compartment, which comprises a roof body 3 as well as right-hand and left-hand roof plate panels 4R and 4L, respectively. The roof body 3 in turn comprises a front roof section 3a constituting a front portion of the roof body and supporting the upper end of a front window glass panel 5, a rear roof section 3b constituting a rear portion thereof and supporting the upper end of a rear window glass panel 6, and a central roof section 3c interposed between the front roof section 3a and the rear roof section 3b and extending longitudinally in a transversely middle position between both roof sides.

On the left-hand and right-hand sides of the central roof section 3c are disposed a left-hand roof aperture 7L and a right-hand roof aperture 7R, a left-hand roof aperture 7L facing a left-hand side of the vehicle body and communicated continuously to an aperture 8a for a left-hand side door 8 as well as a right-hand roof aperture 7R facing a right-hand side thereof and communicated continuously to an aperture 9a for a right-hand side door 9. Three sides of each of the left-hand and right-hand roof apertures 7L and 7R are surrounded by the roof sections 3a, 3b and 3c of the roof body 3. More specifically, a front side of each of the left-hand roof aperture 7L and the right-hand roof aperture 7R is connected to the front roof section 3a thereof, a rear side thereof is connected to the rear roof section 3b thereof, and an inner side thereof is connected to the central roof section 3c thereof.

The left-hand roof plate panel 4L is so mounted as to cover the left-hand roof aperture 7L, while the right-hand roof plate panel 4R is so mounted as to cover the right-hand roof aperture 7R. The roof structure of the arrangement as described hereinabove is known as a T-bar roof, so that further description thereof will be omitted from the description which follows. It is noted herein that the left-hand roof plate panel 4L and the right-hand roof plate panel 4R may be referred to merely as roof plate panel 4 in generic terms and that the left-hand roof aperture 7L and the right-hand roof aperture 7R may be referred to merely as roof aperture 7 in generic terms.

Figure 3:
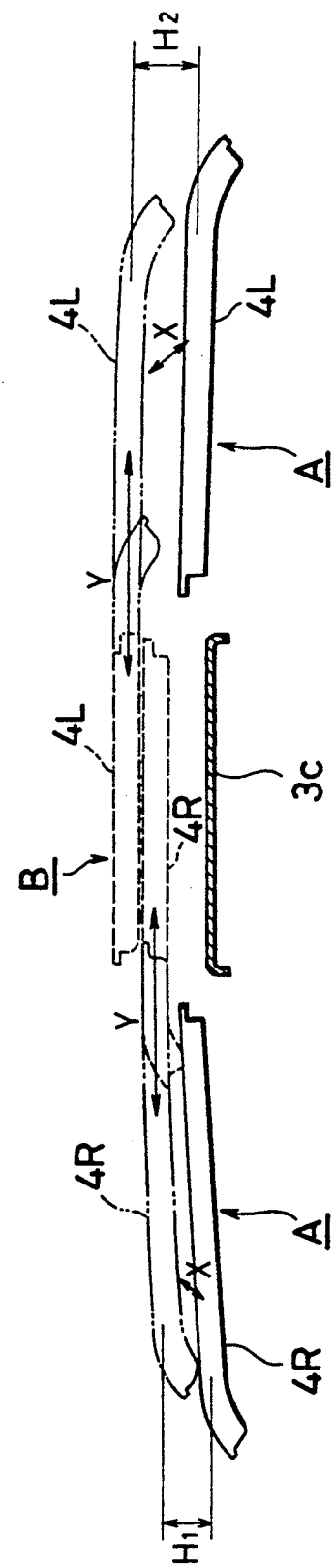
FIG. 3 is a schematic representation showing a locus of the travel of the left-hand and right-hand roof plate panels.

The roof plate panel 4 is disposed to move or travel in the transverse direction of the vehicle body between its closed position A in which the roof aperture 7 is closed and its open position B, located above the central roof section 3c, in which the roof aperture 7 is opened. Referring to FIG. 3, description will be made of operation to open the right-hand roof aperture 7R. The right-hand roof plate panel 4R is moved or travelled from its closed position A to its open position B to open the right-hand roof aperture 7R. More specifically, the right-hand roof plate panel 4R located in its closed position A is first moved inwardly (to the right in the drawing) in an obliquely upward direction in a predetermined height $H_1$, as indicated by the up-arrow X in FIG. 3, and then travelled inwardly (to the right in the drawing) in a horizontal direction toward the central position of the central roof section 3c (as indicated by the arrow Y therein) to assume its open position B, as indicated by the phantom line therein.

In order to transfer the right-hand roof plate panel 4R to close the right-hand roof aperture 7R, the practices as described hereinabove should be followed in the opposite ways.

Description will now be made of the operation of opening the left-hand roof plate panel 4L located in its closed position A on the left-hand side of the automotive vehicle. More specifically, the left-hand roof plate panel 4L located in its closed position A is first moved inwardly (to the left in the drawing) in an obliquely upward direction in a predetermined height $H_2$, as indicated by the up-arrow X in FIG. 3, and then travelled inwardly (to the left in the drawing) in a horizontal direction toward the central position of the central roof section 3c (as indicated by the arrow Y therein) to assume its open position B, as indicated by the phantom line therein. When the left-hand roof plate panel 4L is moved from its closed position A to its open position B to close the left-hand roof aperture 7L, it is moved therefrom in the ways opposite to the procedures as described immediately hereinabove.

When the left-hand roof plate panel 4L and the right-hand roof plate panel 4R are located in their closed positions A above the central roof section 3c of the roof body 3, the left-hand roof plate panel 4L is superimposed on the right-hand roof plate panel 4R without causing any interference with each other.

In order to allow the left-hand roof plate panel 4L to be superimposed on the right-hand roof plate panel 4R when they are located in their open positions B, the predetermined height H in which the right-hand roof plate panel 4R is moved or travelled inwardly in an obliquely upward direction X from its closed position A in the direction as indicated by the right arrow Y in FIG. 3 is set to be larger than the predetermined height H, in which the left-hand roof plate panel 4L is moved or travelled inwardly in an obliquely upward direction X from its closed position A in the direction as indicated by the left arrow Y in FIG. 3.

It is to be understood herein that the present invention should not be restricted to the superimposition of the right-hand roof plate panel 4R on the left-hand roof plate panel 4L and that it should be construed to contain the arrangement of the roof plate panels in such a manner that the left-hand roof plate panel 4L is superimposed on the right-hand roof plate panel 4R.

Figure 2:
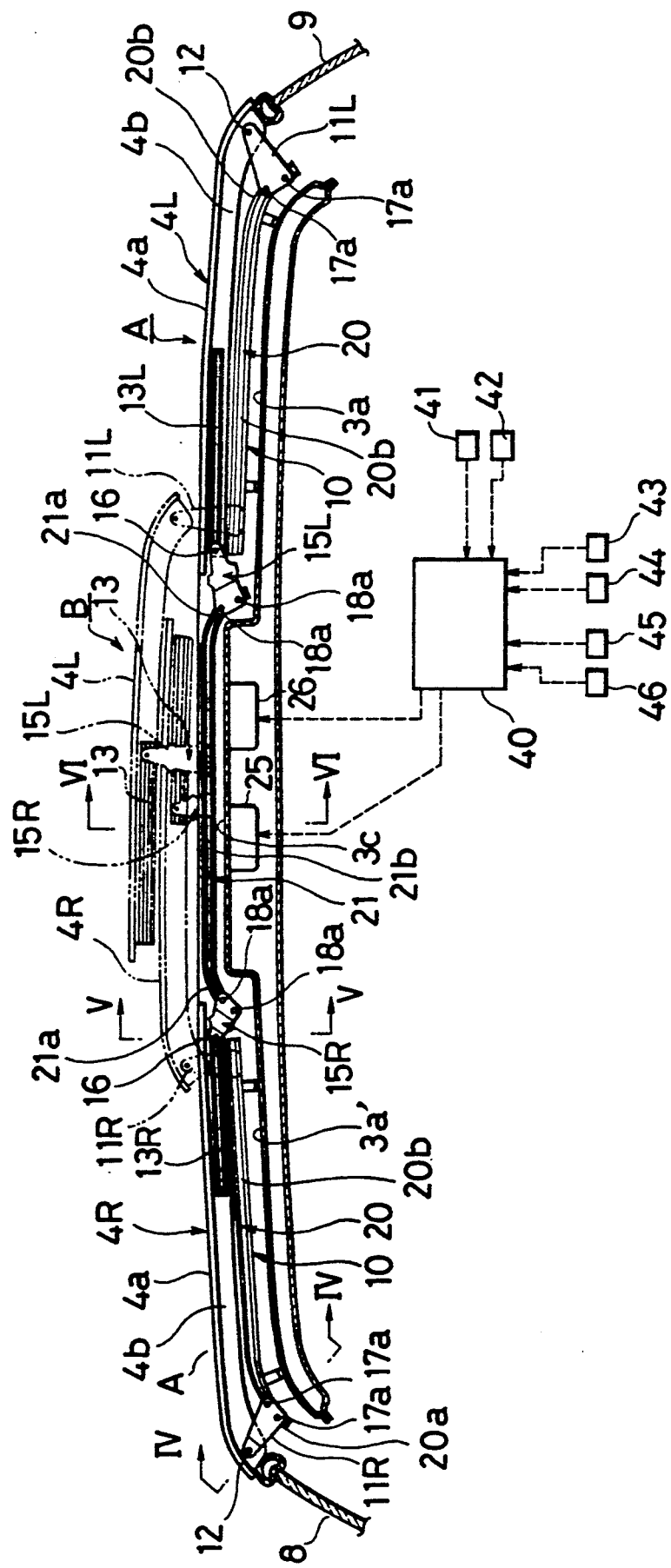
FIG. 2 is a sectional view taken along line II—II of FIG. 1.
Figure 4:
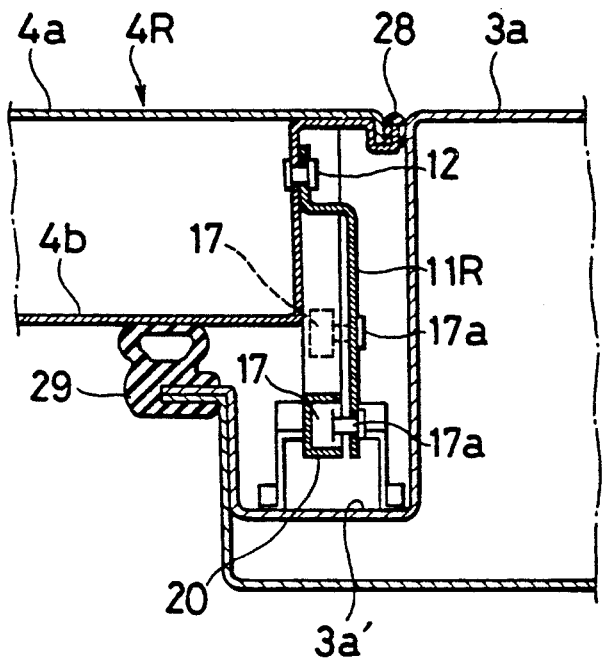
FIG. 4 is a sectional view taken along line IV—IV of FIG. 2.

Turning now to FIGS. 2 and 4 et seq, a sliding mechanism 10 for sliding the roof plate panel 4 will be described more in detail. The sliding mechanism 10 is mounted at a front portion and a rear portion of each of the roof plate panels 4. It is to be noted that the sliding mechanism 10 mounted at the front portion thereof has the same mechanism and structure as that mounted at the rear portion thereof and, further, that the sliding mechanism 10 mounted to the right-hand roof plate panel 4R has basically the same mechanism and structure as that mounted to the left-hand roof plate panel 4L. Hence, description is made of the sliding mechanism 10 mounted at the front portion of the right-hand roof plate panel 4R as a representative example and description of the sliding mechanism 10 for the left-hand roof plate panel 4L will be made solely of the points that differ from the sliding mechanism 10 for the right-hand roof plate panel 4R.

As shown in FIG. 2, the roof plate panel 4 comprises an upper roof plate panel 4a and a lower roof plate panel 4b. An outer pivotable mounting piece 11 in a nearly triangular shape is mounted at a transversely outer end portion of the vehicle body to a front side face composed of the lower roof plate panel 4b. As shown specifically in FIG. 4, the outer pivotal mounting piece 11 is mounted at its top portion to a front side of the roof plate panel 4 through a first pin 12, thereby allowing the outer pivotal mounting piece 11 to be pivotable on the first pin 12.

Figure 5:
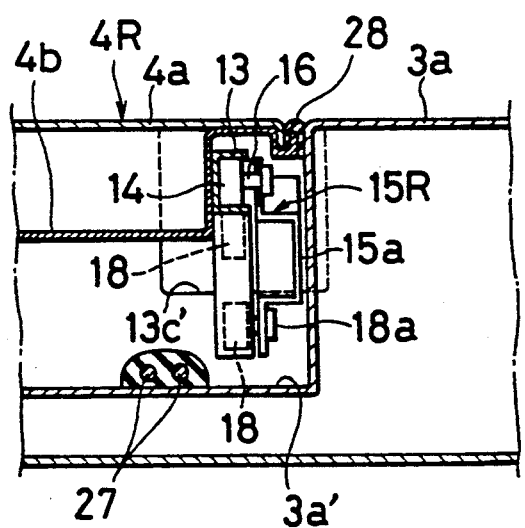
FIG. 5 is a sectional view taken along line V—V of FIG. 2.
Figure 6:
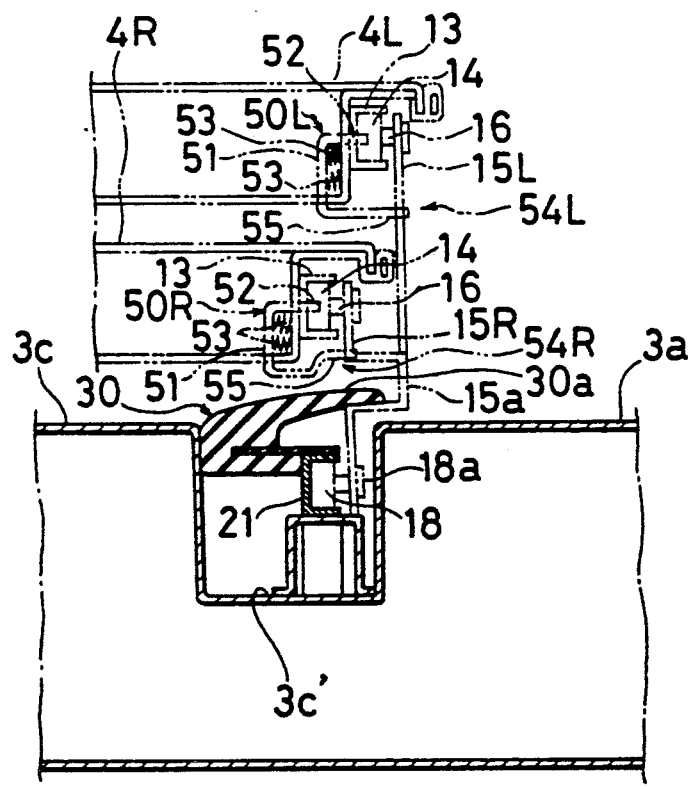
FIG. 6 is a sectional view taken along line VI—VI of FIG. 2.

On the other hand, as shown in FIG. 2, a first guide rail 13 is fixed to the front side of the roof plate panel 4 at its inner end portion in the transverse direction of the vehicle body. The first guide rail 13 extends outward in the transverse direction thereof from the inner end of the roof plate panel 4 to a substantially central portion thereof. The first guide rail 13 guides a first roller 14 in the transverse direction of the vehicle body, to which an inner pivotable mounting piece 15 is mounted as shown in FIGS. 5 and 6. The inner pivotable mounting piece 15 is of a nearly triangular shape, like the outer pivotable mounting piece 11, and a top portion of the inner mounting piece 15 is mounted to the first roller 14 so as to be pivotable through a second pin 16.

To a bottom side portion of the outer pivotable mounting piece 11 are pivotably mounted two rollers 17 and 17 disposed in a transversely apart relationship through a pin 17a. Likewise, two rollers 18 and 18 are pivotably mounted through a pin 18a to a bottom side portion of the inner pivotable mounting piece 15 in a transversely spaced arrangement.

To the roof body 2 are mounted a second guide rail 20 and a third guide rail 21 so as to be associated with the rollers 17, 17 and 18, 18, respectively, each of which extends in the transverse direction of the vehicle body. The second guide rail 20 is secured to a concave section 3a' formed at a rear end portion of the front roof section 3a defining part of the roof aperture 7 and arranged to accommodate the outer pivotable mounting piece 11 and the rollers 17 within it. The concave section 3a' constitutes a rain rail disposed about the roof aperture 7.

As shown in FIG. 6, the central roof section 3c is provided with a concave section 3c' extending in the transverse direction of the vehicle body so as to correspond to the concave section 3a' formed in the front roof section 3a. Fixed to the concave section 3c' is the third guide rail 21 in such a manner that the third guide rail 21 is disposed in the position higher than the second guide rail 20 and that it is arranged to accommodate the inner pivotable mounting piece 15 and the rollers 18. The third guide rail 21 is disposed to extend over the entire transverse length of the central roof section 3c of the roof body 3, thereby functioning as a common guide rail for the left-hand roof plate panel 4L and the right-hand roof plate panel 4R and guiding the inner pivotable mounting piece 15L for the left-hand roof plate panel 4L and the inner pivotable mounting piece 15R for the right-hand roof plate panel 4R.

Description will now be made of shapes of the second guide rail 20 and the third guide rail 21. A transversely outer end portion of the second guide rail 20 constitutes a curved portion 20a of such a shape as curving downwards and the portion inside the curved portion 20a constitutes a horizontal portion 20b extending in a substantially horizontal direction of the vehicle body. Likewise, the third guide rail 21 is provided with a curved portion 21a at its transversely outer end portion and with a horizontal portion 21b located in the position inside the curved portion 21a. The curved portion 21a of the third guide rail 21 is curved outwardly downwards and the horizontal portion 21b thereof is disposed to extend in a substantially horizontal direction.

The height dimension of the outer pivotable mounting piece 11 is set to be different from the height dimension of the inner pivotable mounting piece 15 so as to correspond to the difference in height between the second guide rail 20 and the third guide rail 21. More specifically, in this embodiment, the length dimension of the outer pivotable mounting piece 11 is set to be longer than that of the inner pivotable mounting piece 15, thereby allowing the left-hand roof plate panel 4L to be superimposed on the right-hand roof plate panel 4R. Conversely, it is possible to set the length dimension of the outer pivotable mounting piece 11 to be shorter than that of the inner pivotable mounting piece 15. In this case, the right-hand roof plate panel 4R is superimposed on the left-hand roof plate panel 4L.

When the right-hand roof plate panel 4R is located in its closed position A as indicated by the solid line in FIG. 2, the outer pivotable mounting piece 11 is positioned on the curved section 20a of the second guide rail 20 so that it assumes a lean posture as shown in FIG. 2. Likewise, when the left-hand roof plate panel 4L is located in its closed position A as indicated by the solid line in FIG. 2, the inner pivotable mounting piece 15 is positioned on the curved section 21a of the third guide rail 21 and it assumes a lean posture as shown in FIG. 2.

As the right-hand roof plate panel 4R starts moving or travelling from its closed position A to its open position B, the outer pivotable mounting piece 11 starts displacing from the position located in a lean posture at the curved section 20a of the second guide rail 20 toward the horizontal section 20b thereof, while the inner pivotable mounting piece 15 starts likewise displacing from the position located in a lean posture at the curved section 21a of the third guide rail 21 toward the horizontal section 21b thereof. As the right-hand roof plate panel 4R moves or travels along the respective guide rails 20 and 21, the outer pivotable mounting piece 11 and the inner pivotable mounting piece 15 start erecting gradually. As the outer pivotable mounting piece 11 and the inner pivotable mounting piece 15 are erecting, the right-hand roof plate panel 4R starts displacing upwards while moving or travelling in a horizontal direction.

After the outer pivotable mounting piece 11 has been transferred from the curved section 20a of the second guide rail 20 to the horizontal section 20b thereof and the inner pivotable mounting piece 15 has been likewise transferred from the curved section 21a of the third guide L- rail 21 to the horizontal section 21b thereof, the right-hand roof plate panel 4R starts moving or travelling in a horizontal direction up to its open position B. It is to be noted herein that, as the third guide rail 21 works as a common rail for the right-hand roof plate panel 4R and the left-hand roof plate panel 4L as described hereinabove, the inner pivotable mounting piece 15R for the right-hand roof plate panel 4R and the inner pivotable mounting piece 15L for the left-hand roof plate panel 4L stop moving at a middle portion of the central roof section 3c when the right-hand roof plate panel 4R and the left-hand roof plate panel 4L are opened in synchronization. After the inner pivotable mounting pieces 15R and 15L for the respective roof plate panels 4R and 4L have stopped moving, each of the roof plate panels 4R and 4L starts moving horizontally along the first guide rail 13.

The length dimension of each of the outer pivotable mounting piece 11L and the inner pivotable mounting piece 15L for the left-hand roof plate panel 4L is set to be higher by the thickness of the roof plate panel 4 than that of each of the outer pivotable mounting piece 11R and the inner pivotable mounting piece 15R for the right-hand roof plate panel 4R. Further, as will be apparent from FIG. 6, the longitudinal length of the right-hand roof plate panel 4R is set to be shorter than that of the left-hand roof plate panel 4L. With this arrangement, the left-hand roof plate panel 4L can be superimposed on the right-hand roof plate panel 4R without causing the right-hand roof plate panel 4R to interfere with the left-hand roof plate panel 4L and the pivotable mounting pieces 11 and 15 for the right-hand roof plate panel 4R to interfere with those for the left-hand roof plate panel 4L. As a matter of course, although described hereinabove, the right-hand roof plate panel 4R can be superimposed on the left-hand roof plate panel 4L without interference from each other when the length dimension of the pivotable mounting pieces 11 and 15 for the roof plate panel 4 and the longitudinal length dimension for the roof plate panel 4 are set to be opposite to the dimensions as described immediately hereinabove.

Figure 7:
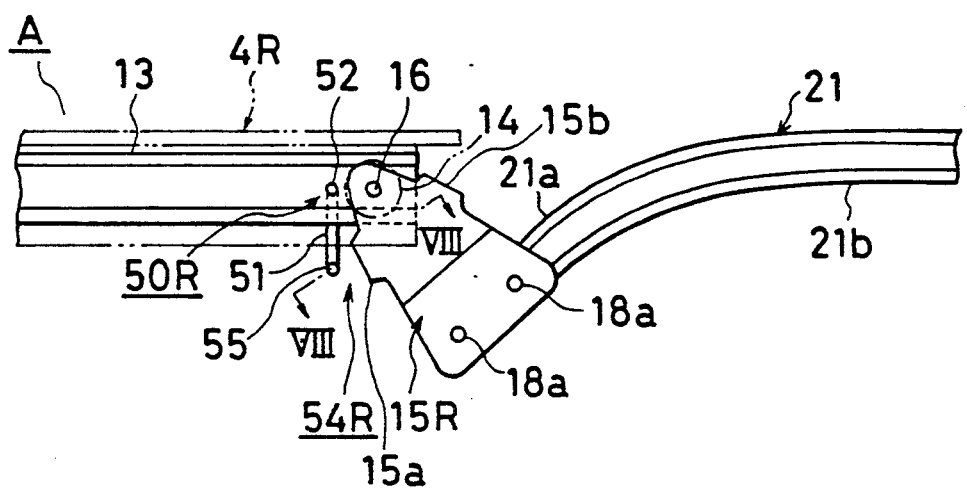
FIG. 7 is a partially enlarged side view showing an inner end portion of the roof plate panel located in its closed position and a portion in the vicinity thereof.
Figure 8:
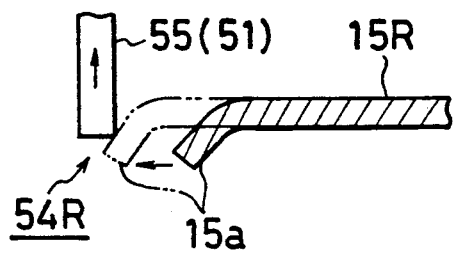
FIG. 8 is a schematically sectional view showing a mechanism for releasing a stopper, when taken along VIII—VIII of FIG. 7.

It is to be noted herein that, although not shown in FIG. 2, the first guide rail 13 for each of the right-hand roof plate panel 4R and the left-hand roof plate panel 4L is provided at its inner end portion with a stopper 50 as shown in FIGS. 6 and 7. The stopper 50 is so arranged as to suppress the first roller 14 for the inner pivotable mounting piece 15R or 15L from moving in the initial stage that the right-hand roof plate panel 4R or the left-hand roof plate panel 4L starts moving or travelling from its closed position A to its open position B, although it is arranged to release the suppression of the movement of the first roller 14 in association with the erect movement of the inner pivotable mounting piece 15R or 15L. As the right-hand stopper 50R has the same structure as the left-hand stopper 50L, they are referred to merely as stopper 50 in generic terms unless it is not required to strictly distinguish the right-hand stopper 50R from the left-hand stopper 50L, and description will be made of the stopper 50.

As shown in FIG. 7, the stopper 50 is mounted to an inner end portion of the first guide rail 13 mounted to the roof plate panel 4. The stopper 50 comprises a top end section (a stopper section) 52 of a pin member 51 curved in a generally squared C-shaped form as shown in FIG. 6. The pin member 51 is so disposed as to allow the stopper section 52 to project from the first guide rail 13 and the pin member 51 is biased toward the right in this drawing by a tension spring 53 interposed between the pin member 51 and the roof plate panel 4. In other words, the pin member 51 is biased in the direction in which its stopper section 52 can project from the first guide rail 13. As the stopper section 52 projects from the first guide rail 13, the first roller 14 (the upper end portion of the inner pivotable mounting piece 15) is inhibited from moving by the stopper section 52.

A releasing mechanism 54 for releasing the stopper 50 comprises a bottom end portion (a stopper-releasing section) 55 as an element. Curved sections 15a and 15b formed on both sides of the inner pivotable mounting piece 15 serve as the other element of the releasing mechanism 54. As the roof plate panel 4 starts moving or travelling from its closed position A to its open position B, the first roller 14 is suppressed from moving by the stopper 50 (the stopper section 52) and, as a consequence, the inner pivotable mounting piece 15 is guided by the third guide rail 21 and moved inwardly to start erecting. As the inner pivotable mounting piece 15 starts erecting, the curved section 15a of the inner pivotable mounting piece 15 approaches the position closer to the stopper-releasing section 55 of the pin member 51. After the curved section 15a of the inner pivotable mounting piece 15 comes into contact with the stopper-releasing section 55 of the pin member 51, the curved section 15a thereof depresses the pin member 51, thereby allowing the stopper section 52 to be pulled from the first guide rail 13 and releasing the stopper 50. It is noted that the other curved section 15b of the inner pivotable mounting piece 15 serves as a mechanism for releasing the stopper 50 when the roof plate panel 4 moves or travels from its open position B to its closed position A to close the roof aperture 7.

As shown in FIG. 2, reference numeral 25 stands for an electric motor unit for the right-hand roof plate panel 4R and reference numeral 26 stands for an electric motor unit for the left-hand roof plate panel 4L. The right-hand roof plate panel 4R and the left-hand roof plate panel 4L are moved to open or close the respective roof apertures 7 by rotating and reversing the rotation of the electric motor units 25 and 26, respectively. The electric motor unit 25 is connected to the outer pivotable mounting piece 11R for the right-hand roof plate panel 4R through a cable 27 and the electric motor unit 26 is connected to the outer pivotable mounting piece 11L for the left-hand roof plate panel 4L through a cable 28. This arrangement is per se known so that further description will be omitted from the following explanation.

As shown in FIGS. 4 and 5, reference numerals 28 and 29 denote each a sealing member for sealing the roof plate panel 4 when located in its closed position A, in order to prevent rain drops from leaking into the vehicle compartment of the automotive vehicle.

Turning to FIG. 6, reference numeral 30 denotes a sealing member disposed within the concave portion 3c' of the central roof section 3c. The sealing member 30 is disposed within the third guide rail 21 to prevent the third guide rail 21 from being exposed to the outside and to protect it from rain. The sealing member 30 is so disposed as to allow its lip portion 30a to be raised upwards by the inner pivotable mounting piece 15 as the roof plate panel 4 travels towards its open position B. As shown in FIG. 6, the inner pivotable mounting piece 15 has the curved section 15a that is engageable with the lip portion 30a which in turn is raised by the curved section 15a.

As shown in FIG. 2, reference numeral 40 denotes a control unit into which signals are entered from manual switches 41 to 46, inclusive. The control unit 40 generates control signals to the electric motor units 25 and 26.

The manual switch 41 is to perform an operation for opening the left-hand roof plate panel 4L and the right-hand roof plate panel 4R in synchronization with each other and the manual switch 42 is to perform an operation for closing the left-hand roof plate panel 4L and the right-hand roof plate panel 4R in synchronization with each other. The manual switch 43 is to open the right-hand roof plate panel 4R singly and the manual switch 44 is to close the right-hand roof plate panel 4R singly. On the other hand, the manual switch 45 is to open the left-hand roof plate panel 4L singly and the manual switch 46 is to close the left-hand roof plate panel 4L singly.

The control unit 40 is to perform the following control in response to signals entered from the manual switches 41 to 46.

Manual Switch 41:

When the manual switch 41 is turned on, the control unit 40 generates a driving signal in synchronization with the electric motor units 25 and 26 to move the left-hand roof plate panel 4L and the right-hand roof plate panel 4R from their closed positions A to their open positions B and to suspend their movement in their open positions B, thereby opening the respective left-hand and right-hand roof apertures 7L and 7R over their entire length.

Manual Switch 42:

When the manual switch 42 is turned on, the control unit 40 generates a driving signal in synchronization with the electric motor units 25 and 26 to move the left-hand roof plate panel 4L and the right-hand roof plate panel 4R from their open positions B to their closed positions A, thereby closing the left-hand roof aperture 7L and the right-hand roof aperture 7R, respectively, while the movement of the roof plate panels 4 is suspended in their closed positions A.

Manual Switch 43:

When the manual switch 43 is turned on, the right-hand roof plate panel 4R starts moving from its closed position and keeps moving while the manual switch 43 is being pressed. As the manual switch 43 is turned off, the right-hand roof plate panel 4R stops opening at the time when the manual switch 43 was turned off.

Manual Switch 44:

When the manual switch 44 is turned on, the right-hand roof plate panel 4R starts moving from its open position and keeps moving to close the right-hand roof aperture 7R while the manual switch 43 keeps being pressed. When the manual switch 43 is turned off, the right-hand roof plate panel 4R stops moving at the time when the manual switch 43 was turned off.

Manual Switch 45:

When the manual switch 45 is turned on, the left-hand roof plate panel 4L starts moving from its closed position and keeps opening the left-hand roof aperture 7L while the manual switch 44 keeps being pressed. When the manual switch 44 is turned off, the left-hand roof plate panel 4L stops moving at the time when the manual switch 44 was turned off.

Manual Switch 46:

When the manual switch 46 is turned on, the left-hand roof plate panel 4L starts moving from its open position and keeps closing the left-hand roof aperture 7L while the manual switch 45 keeps being pressed. As the manual switch 45 is turned off to release the closing operation, the left-hand roof plate panel 4L stops moving at the time when the manual switch 46 was turned off.

By operating the manual switches 43 to 46, inclusive, each of the right-hand roof plate panel 4R and the left-hand roof plate panel 4L can be suspended at a desired position to adjust an open area of the roof aperture and to control the amount of incoming air. Further, in this embodiment, the third guide rail 21 is mounted to the concave portion 3c' of the central roof section 3c and it is accommodated entirely within the concave portion 3c' thereof, so that an appearance of the automotive vehicle is not impaired even when the right-hand roof plate panel 4R and the left-hand roof plate panel 4L are located in their closed positions A.

As is apparent from the description as described hereinabove, the first aspect of the present invention can extend the open area of the roof aperture to an extremely larger extent for the automotive vehicle of a so-called T-bar roof type than conventional ones, thereby further improving open and refreshing feel inherent in the automotive vehicle of the T-bar roof type.

According to the second aspect of the present invention, the roof plate panel is disposed in a more stable manner in which it can move during the process of running the automotive vehicle, than the roof plate panel for conventional automotive vehicles of a T-bar roof type, so that the open area of the roof aperture can be adjusted with high freedom by suspending the movement of the roof plate panel. Further, the locus of the travel of the left-hand roof plate panel does not intersect the locus of the travel of the right-hand roof plate panel, so that there is no risk that the left-hand roof plate panel interferes with the right-hand roof plate panel even if the left-hand and right-hand roof plate panels are moved or travelled in synchronization with each other. Further, as the left-hand roof plate panel can be superimposed on the right-hand roof plate panel, the open area of the roof aperture can be utilized more efficiently and effectively than conventional T-bar roof type automotive vehicles.

The present invention may be embodied in many other specific forms without departing from the spirit and scope of the invention. The present embodiments as described hereinabove are therefore to be construed in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A roof structure of an automotive vehicle, comprising:

a roof body covering a vehicle compartment, said roof body comprising a front roof section, a rear roof section and a central roof section, said front roof section being disposed at a front portion of said roof body, said rear roof section being disposed at a rear portion thereof, and said central roof section being interposed between said front roof section and said rear roof section and extending longitudinally in a middle position between left-hand and right-hand roof sides, wherein said roof body is provided with a first roof aperture on the left-hand roof side and a second roof aperture on the right-hand roof side of said roof body;

an outer side of said first roof aperture being continuous with an aperture for a first side door, a front side thereof being bounded by said front roof section, a rear side thereof being bounded by said rear roof section, an inner side thereof being bounded by one side of said central roof section;

an outer side of said second roof aperture being continuous with an aperture for a second side door, a front side thereof being bounded by said front roof section, a rear side thereof being bounded by said rear roof section, and an inner side thereof being bounded by the other side of said central roof section;

said roof aperture having a first roof plate panel movable between a closed position wherein said first roof aperture is closed with said first roof plate panel and an open position wherein said first roof aperture is opened over its entire longitudinal length and said first roof plate panel is located over said central roof section; and said second roof aperture having a second roof plate panel movable between a closed position wherein said second roof aperture is closed with said second roof plate panel and said open position wherein said second roof aperture is opened over its entire longitudinal length and said second roof plate panel is located over said central roof section;

wherein said first roof plate panel is superimposed on said second roof plate panel when each of said first roof plate panel and said second roof plate panel is located in said open position.

2. A roof structure of an automotive vehicle, comprising:

a roof body covering a vehicle compartment, said roof body comprising a front roof section, a rear roof section and a central roof section, said front roof section being disposed at a front portion of said roof body, said rear roof section being disposed at a rear portion thereof, and said central roof section being interposed between said front roof section and said rear roof section and extending longitudinally in a middle position between left-hand and right-hand roof sides, wherein said roof body is provided with a first roof aperture on the left-hand roof side and a second roof aperture on the right-hand roof side of said roof body;

an outer side of said first roof aperture being continuous with an aperture for a first side door, a front side thereof being bounded by said front roof section, a rear side thereof being bounded by said rear roof section, and an inner side thereof being bounded by one side of said central roof section;

an outer side of said second roof aperture being continuous with an aperture for a second side door, a front side thereof being bounded by said front roof section, a rear side thereof being bounded by said rear roof section, and an inner side thereof being bounded by the other side of central roof section;

said first roof aperture having a first roof plate panel movable between a closed position wherein said first roof aperture is closed with said first roof plate panel and an open position wherein said first roof aperture is opened over its entire longitudinal length and said first roof plate panel is located over said central roof section; and said second roof aperture having a second roof plate panel movable between a closed position wherein said second roof aperture is closed with said second roof plate panel and an open position wherein said second roof aperture is opened over its entire longitudinal length and said second roof plate panel is located over said central roof section;

wherein each of said first roof plate panel and said second roof plate panel moves from said respective closed position to said respective open position by moving each of said first roof plate panel and said second roof plate panel upwards a predetermined distance from said respective closed position and moving each of said first roof plate panel and said second roof plate panel horizontally toward said central roof section to said respective open position;

wherein each of said first roof plate panel and said second roof plate panel moves from said respective open position to said respective closed position by moving each of said first roof plate panel and said second roof plate panel horizontally from said respective open position in a direction opposite to the direction in which each of said first roof plate panel and said second roof plate panel is moved to open said respective first and second roof plate apertures and by moving each of said first roof plate panel and said second roof plate panel downwards said predetermined distance toward said respective closed position;

wherein said predetermined distance in which said first roof plate panel is moved upwards or downwards differs from said predetermined distance in which said second roof plate panel is moved upwards or downwards; and wherein one of said first and second roof plate panels is superimposed on the other of said first and second roof plate panels when both of said first and second roof plate panels are located in said respective open position.

3. A roof structure of an automotive vehicle as claimed in claim 1, wherein a guide rail means is mounted to said roof body in a transverse direction of said automotive vehicle to guide each of said first roof panel plate and said second roof panel plate between said closed position and said open position.

4. A roof structure of an automotive vehicle as claimed in claim 3, wherein said guide rail means comprises a first guide rail corresponding to said roof aperture and a second guide rail corresponding to each said central roof section.

5. A roof structure of an automotive vehicle as claimed in claim 4, wherein each of said first guide rails and said second guide rail are disposed in a substantially horizontal direction and an outer end portion of each of said first guide rails and said second guide rail is curved downwards.

6. A roof structure of an automotive vehicle as claimed in claim 5, wherein:

a first pivotable mounting piece is pivotably mounted to a transversely outer end portion of each of said first and second roof plate panels so as to be each guided in a respective said first guide rail;

a second pivotable mounting piece is pivotably mounted to a transversely inner end portion of each of said first and second roof plate panels; and each of said first pivotable mounting pieces are pivotally mounted to one of said first guide rails and each of said second pivotable mounting pieces are pivotably mounted to said second guide rail.

7. A roof structure of an automotive vehicle as claimed in claim 6, wherein:

each said first pivotable mounting piece is mounted to one of said first guide rails through two rollers disposed in a transversely spaced relationship; and each said second pivotable mounting piece is mounted to said second guide rail through two rollers disposed in a transversely spaced relationship.

8. A roof structure of an automotive vehicle as claimed in claim 6, wherein:

said second guide rail comprises a common guide rail for said first roof plate panel and said second roof plate panel; and each of said first roof plate panel and said second guide rail is provided with a third guide rail for guiding said second pivotable mounting piece in a transverse direction of said automotive vehicle.

9. A roof structure of an automotive vehicle as claimed in claim 7, wherein:

said first pivotable mounting piece is mounted to a longitudinally forward side surface of each of said first roof plate panel and said second roof plate panel; and said second pivotable mounting piece is mounted to a longitudinally rearward side surface of each of said first roof plate panel and said second roof plate panel.

10. A roof structure of an automotive vehicle as claimed in claim 9, wherein said first roof plate panel has a longitudinal length different from said second roof plate panel in such a manner that said first roof plate panel does not interfere with said second roof plate panel when each of said first and second roof plate panels is located in said open position.

11. A roof structure of an automotive vehicle as claimed in claim 1, wherein each of said first roof plate panel and said second roof plate panel is electrically movable.

12. A roof structure of an automotive vehicle as claimed in claim 11, wherein:

a first electric motor unit is mounted to said central roof section on one side of said automotive vehicle in association with said first roof plate panel; and a second electric motor unit is mounted to said central roof section on another side of said automotive vehicle in association with said second roof plate panel.

13. A roof structure of an automotive vehicle as claimed in claim 12, further comprising a control unit for controlling said first and second electric motor units in response to a signal from a manual switch.

14. A roof structure of an automotive vehicle as claimed in claim 13, wherein said control unit is set to open or close said first roof plate panel and said second roof plate panel in synchronization with each other.

15. A roof structure of an automotive vehicle as claimed in claim 13, wherein said control unit is set to open or close said first roof plate panel and said second roof plate panel independently or separately from each other.

16. A roof structure of an automotive vehicle as claimed in claim 13, wherein said control unit is set to suspend rotation of each of said first electric motor unit and said second electric motor unit when operation by said manual switch is released.

* * * * *